June 22, 1948.　　　　　G. E. KING　　　　　2,443,657
MOTOR CONTROL SYSTEM
Filed Nov. 21, 1946　　　　　　　　　　3 Sheets-Sheet 1

WITNESSES:
E. A. McCloskey
C. W. Avery

INVENTOR
George E. King.
BY
Paul E. Friedemann
ATTORNEY

June 22, 1948.  G. E. KING  2,443,657

MOTOR CONTROL SYSTEM

Filed Nov. 21, 1946   3 Sheets-Sheet 2

WITNESSES:
E.A. McBlakey
C. M. Avery

INVENTOR
George E. King.
BY
Paul E. Friedemann
ATTORNEY

June 22, 1948.  G. E. KING  2,443,657
MOTOR CONTROL SYSTEM
Filed Nov. 21, 1946  3 Sheets-Sheet 3

WITNESSES:

INVENTOR
George E. King.
BY
Paul E. Friedemann
ATTORNEY

Patented June 22, 1948

2,443,657

UNITED STATES PATENT OFFICE 2,443,657

MOTOR CONTROL SYSTEM

George E. King, Swissvale, Pa., assignor to Westinghouse Electric Corporation, East Pittsburgh, Pa., a corporation of Pennsylvania Application November 21, 1946, Serial No. 711,425

14 Claims. (Cl. 318—42)

1

My invention relates to systems for controlling a plurality of electric drives of correlated performance, for instance so that these drives maintain a substantially fixed speed ratio or a substantially fixed positional relation to one another at different speeds and regardless of differences in load.

An example of application for such systems is the electric control of lift bridges that have two electric motors for separately raising and lowering the two ends of the bridge while operating in synchronism in order to maintain the bridge structure level during its motion although the loads on the two motors may not be the same, due for instance, to snow drifting on one end of the bridge. This example of a lift bridge will be specifically referred to in the following description although it should be kept in mind that the invention permits other applications where similar requirements of correlated speeds or positioning are to be met.

It is an object of my invention to provide a system of the kind above-referred to which affords a variable speed control for direct-current motors and secures a satisfactory synchronism or other speed or positional relation between the simultaneously operating motors with the aid of reliable and rugged control equipment that does not necessitate the addition of power-synchroties. In conjunction therewith, it is also aimed at permitting a selective speed adjustment within relatively wide limits without interfering with the above-mentioned automatic synchronizing or correlating control performance of the system.

According to my invention, I provide a multiple motor-control system with two variable-speed direct-current drives which have respective dynamo-electric machines equipped with speed-controlling field windings, and I interconnect these field windings so that they lie in respective branches of a balanceable network, for instance, of the Wheatstone bridge type. Two terminals or diagonal points of the network are connected across the armature of a control generator with one or several field windings which control the generated control voltage. As long as this voltage is zero, the control generator has no effect on the excitation of the bridge-connected field windings. However, when the voltage of the control generator assumes a finite value, this voltage is imposed on the bridge-connected field windings so as to have opposing effects on the performance of the two drives. That is, when the control voltage has a finite value of one polarity, it will reduce the speed-controlling field

2 excitation in one drive and increase it in the other, while when the control voltage has a finite value of the opposite polarity, the first-mentioned drive is adjusted for increased speed while the speed of the other drive is reduced. The field control of the control generator is effected by means of two voltage-control devices which act differentially with respect to each other as regards their effect on the control generator. These voltage-control devices are associated with the two drives so that the rate of their respective adjustment is substantially proportional to the speed of the respective drives. As a result, the control generator operates in dependence upon any departure from given performance relation between the two drives with the effect of maintaining or reestablishing this given relation.

In one aspect of my invention, the above-mentioned field-controlling field windings of the two variable voltage drives are disposed on the main generators that energize the respective drive motors. In this case, the basic speed control is preferably effected by selectively varying a constant direct-current energization imposed on the bridge network of the field windings. Then, the network performs the dual function of permitting a selective speed adjustment and taking care of the regulatory function caused by the above-mentioned control generator.

In another aspect of my invention, the bridge network serves only the function of imposing the above-mentioned differential control or regulating effect on the two drives, while the selective speed adjustment of the dual system is effected by separate means. In the latter case, for instance, the bridge-connected field windings are disposed on the drive motors, while a separately-excited field winding on the appertaining main generator is energized by adjustable voltage for the purpose of setting or varying the desired driving speed.

The foregoing and other objects and features of the invention will be apparent from the following description of the embodiments exemplified in the drawings, in which.

Figure 1:
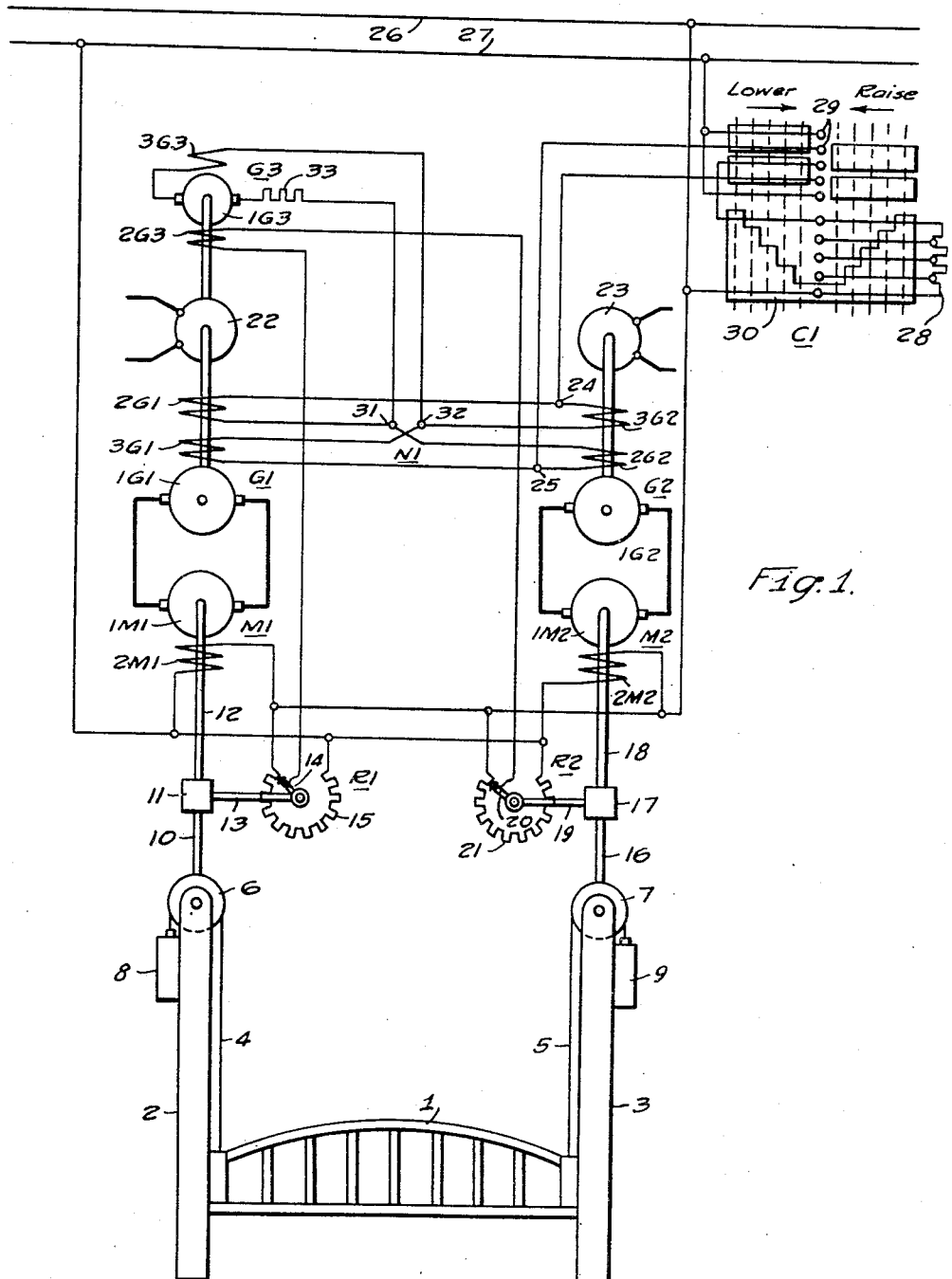
Figure 1 shows diagrammatically a lift bridge with an appertaining electric control system according to the invention, and Fig. 2, a simplified straight-line diagram of the electric circuits in the system of Fig. 1.

In Figure 1, the movable structure of the lift bridge is denoted by 1. This structure is guided in standard structures 2 and 3 and suspended at both ends from cables 4 and 5. These cables are guided over drums 6 and 7 and provided with counterweights 8 and 9, respectively.

The drum 6 has its shaft 10 driven from a reducing gear box 11 which, in turn, is driven by the shaft 12 of a direct-current motor M1. The gear box 11 drives also the shaft 13 of a slide contact 14 in a rheostat R1 so that the contact 14 assumes a position, relative to the appertaining resistor 15, which is indicative of the position of the bridge end to which the cable 4 is attached.

Similarly, the shaft 16 of drum 7 is driven through a gear box 17 from the shaft 18 of a direct-current drive motor M2, and the gear box actuates also the shaft 19 of a slide contact 20 in a rheostat R2 so that the position of contact 20 relative to the appertaining resistor 21 is indicative of the position of the bridge structure at the end of cable 5.

The armatures of motors M1 and M2 are denoted by 1M1 and 1M2, respectively, and the appertaining motor field windings by 2M1 and 2M2, respectively. The motor armatures are connected across the armatures 1G1 and 1G2 of two main generators G1 and G2, respectively.

The generators G1 and G2 have each a pair of cumulative field windings 2G1, 3G1 and 2G2, 3G2, respectively. The generator armatures are driven by respective motors 22 and 23 operating at substantially constant speed so that the magnitude of the direct-current voltage generated in the armatures 1G1 and 1G2 depends substantially only on the resultant excitation of the appertaining generator field windings.

The generator field windings 2G1, 3G1 and 2G2, 3G2 are connected in series relation with one another so as to form a closed circuit which has two points 24 and 25 connected to the respective leads 26 and 27 of a direct-current circuit in series with a rheostat 28 whose effective resistance is controlled by a master controller C1. This controller is schematically shown in Fig. 1 in developed form. It has a group of contact fingers, such as those denoted by 29, and a number of contact segments, such as the one denoted by 30.

Two other points, 31 and 32, of the field winding circuit are connected across the armature 1G3 of a control generator G3. This generator has a separately-excited field winding 2G3 and a self-excited field winding 3G3. The self-excited field winding is shown as a series winding in the circuit of the armature 1G3, and this armature circuit contains also a calibrating resistor 33.

While, in Fig. 1, the armatures and field windings of the dynamo-electric machines are shown in their proper magnetic or inductive association with one another, such a showing renders it difficult to understand the nature of the electric circuit connections between these machine elements. Therefore, the circuits of the above-described system are separately shown in Fig. 2 under disregard of electromagnetic associations, although these associations can be deduced from the fact that the armature and field windings appertaining to the respective machines are denoted by composite reference characters whose last two positions are indicative of the machine to which the designated element belongs.

Figure 2:
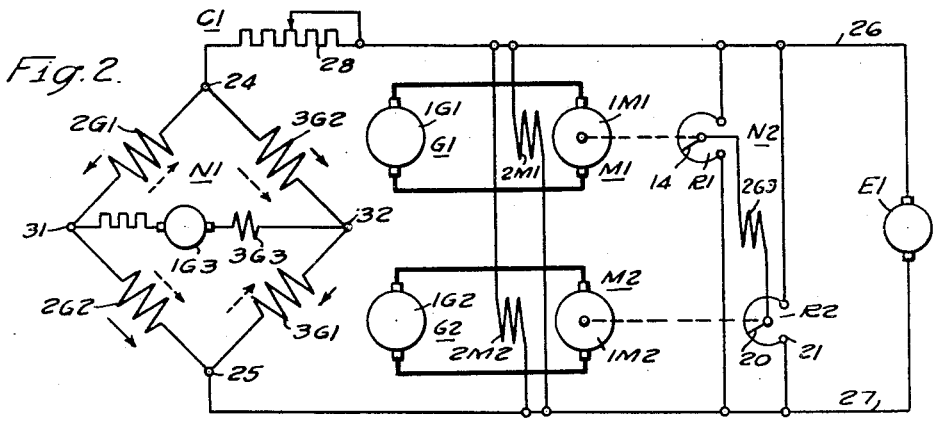

As is more clearly apparent from Fig. 2, the four field windings of the generators G1 and G2 are connected in a network, denoted as a whole by N1, of the Wheatstone bridge type. This bridge receives an adjustable direct-current excitation across its pair of diagonal points 24 and 25 under control by the master controller from the direct-current leads 26 and 27 which, in Fig. 2, are shown to be energized by an exciter E1. Such an exciter may be driven from one of the motors 22 and 23 (Fig. 1).

Fig. 2 makes further apparent that the armature 1G3 of the control generator G3 lies in the diagonal branch of the bridge network in series with its self-excited field winding 3G3 and the appertaining resistor 33. Due to these bridge-type connections, the field windings 2G1 and 3G1 of generator G1 lie in parallel to the field windings 2G2 and 3G2 of generator G2 relative to the energizing current from the exciter E1. When the voltage drop, caused by this current across the bridge diagonal points 24 and 25, is changed by a variation in the adjustment of the rheostat 28, the field excitation in both main generators is changed accordingly and simultaneously. Assuming that the bridge network is balanced under normal operating conditions, the just-mentioned energizing current across bridge points 24 and 25 causes no voltage drop across the diagonal points 31 and 32. When, under these conditions, the voltage generated in armature 1G3 of the control generator is zero, the speed of the two drive motors M1 and M2 is determined only by the setting of the master controller. However, when the control generator generates a voltage, this voltage is superimposed on the normal energization and affects the field windings of the two respective generators in mutually opposing directions. For instance, if the control voltage is of such polarity as to oppose the voltage drop originating from the main energization in field winding 2G1, then the same control voltage will also oppose the main energizing voltage across field winding 3G1 so that the generator G1 receives reduced field excitation and causes the appertaining motor M1 to reduce its speed. The same control voltage has then an additive effect in the field windings 2G2 and 3G2 of the generator G2 so that the latter receives a strengthened field excitation and causes its motor M2 to run faster. A reversal of the control voltage from generator G3 has the effect of reversing the just-mentioned conditions so that the motor M1 is caused to increase its speed, while the motor M2 will slow down accordingly.

The magnitude and direction of the control voltage from generator G3 depend on the excitation of its field winding 2G3. The resistors 15 and 21 of the respective rheostats R1 and R2 are each connected across the leads 26 and 27 of the direct-current circuit. The field winding 2G3 of the control generator is connected across the tap contacts 14 and 20 of these rheostats. As a result, the rheostats and control field winding form together a second bridge-type network N2 which receives constant input excitation. The voltage drop across the diagonal or zero branch of this network, and hence the voltage impressed on the control field winding, depend upon the relative positioning of the contacts 14 and 20. When both contacts have the same position relative to the voltage distribution along the appertaining resistors, the bridge network N2 is balanced and the voltages across control field winding 2G3 is zero, so that then the magnitude of the control voltage in bridge N1 is likewise zero. When the position of one rheostat contact is different from that of the other as regards the voltage division in the appertaining resistors, a voltage drop appears across the zero branch, and the magnitude and polarity of this drop depend upon the corresponding magnitudes of the departure from the proper positional relation between the contacts. Then, a control voltage of corresponding magnitude and polarity is generated in the armature 1G3 and has the above-mentioned effect of differentially changing the field excitation in the two main generators in the direction required to maintain or reestablish a proper relative position of the rheostat contacts.

It thus will be understood that, as long as the two motors M1 and M2 operate in accurate synchronism and lift the two ends of the bridge structure 1 evenly, the moving contacts of rheostats R1 and R2 will maintain the mutual relation necessary for the maintenance of zero voltage in the field winding 2G3 of the control generator. If one motor runs faster than the other, and hence tends to cause an uneven lifting of the bridge structure, the resulting departure from the zero relation of the two rheostat contacts has the effect of reducing the speed of the faster running motor while increasing the speed of the other to the extent needed to prevent the bridge structure from appreciably departing from a level position.

The control generator G3 is preferably of the amplifying type so that its output voltage is proportional to, but of much larger magnitude than, the signal voltage applied across its separately-excited field winding 2G3. Such an amplification can, for instance, be obtained by means of a tuned self-excited field winding as represented by the series field winding 3G3. The resistance of the field circuit of this winding is so adjusted, by a proper calibration of the tuning resistor 33, for instance, that the resistance characteristic coincides approximately with the no-load saturation characteristic of the machine. Under these conditions, and assuming that the control generator operates substantially within the increasing and approximately linear portion of its magnetic characteristic, the field excitation in the control generator needed to sustain the output voltage is furnished substantially fully by the tuned self-excited winding, while the separately-excited winding serves merely to provide the control stimulus for raising or lowering the voltage magnitude. The same performance can be obtained with self-excited field windings in shunt or compound connection.

It will be noted, especially from the showing in Fig. 2, that the bridge network of field windings denoted by N1 serves or cooperates to perform two distinctive control functions. In the first place, this network forms part of the speed-adjusting circuit, connections serving to select or change the desired speed of the two drives under control by the operator. Furthermore, this network also carries the regulatory current from the control generator. If desired, however, only the latter function can be assigned to the network while the speed adjustment is performed by a separate circuit. This will be understood from the embodiment represented by Fig. 3 and the corresponding straight-line diagram of Fig. 4, both relating to one and the same dual control system in which the bridge-connected field windings are those of the drive motors proper.

Figure 3:
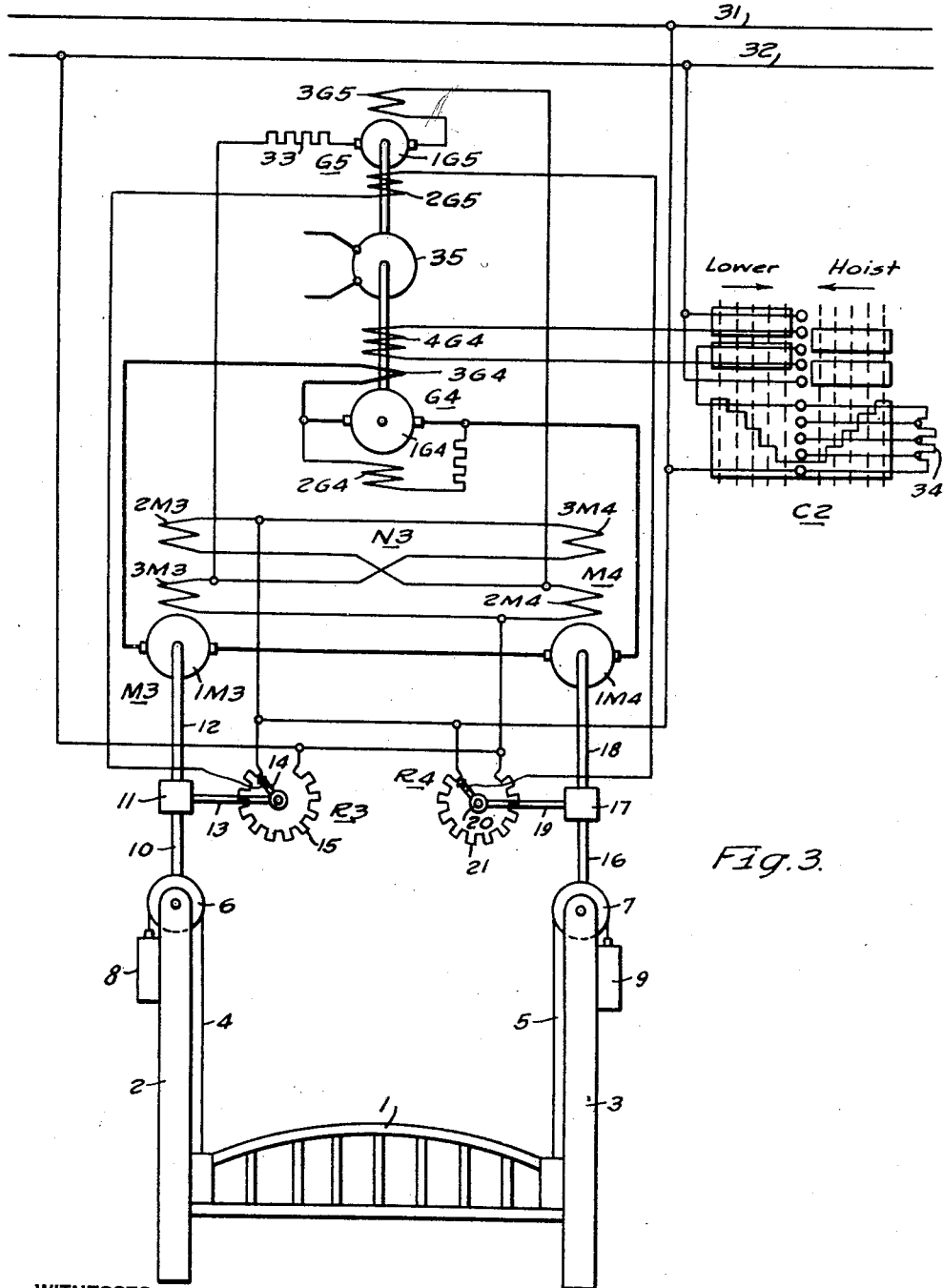
Fig. 3 is a diagrammatic illustration of a modification of the invention, also in conjunction with a lift bridge.

According to Fig. 3, the structure 1 of a lift bridge is driven at opposite ends by two respective motors M3 and M4 which are also geared to respective position-responsive rheostats R3 and R4. The interconnection and function of the just-mentioned parts is identical with the corresponding parts shown in Fig. 1 and explained above. The motors M3 and M4 have each two cumulative field windings 2M3, 3M3 and 2M4, 3M4, respectively. These field windings are connected in a bridge circuit N3 which has two of its diagonal points connected across the leads 31 and 32 of a direct-current circuit energized, for instance, from an exciter, as indicated at E2 in Fig. 4. Connected in the zero diagonal of the bridge network N3 is the armature 1G5 of a control generator G5 in series connection with a self-excited field winding 3G5 and a tuning resistor 33. The control field winding 2G5 of generator G5 is connected between the movable contacts of the rheostats R3 and R4 so that it lies in the zero diagonal of another bridge network N4 substantially as described above with reference to the network N2 shown in Fig. 2.

Figure 4:
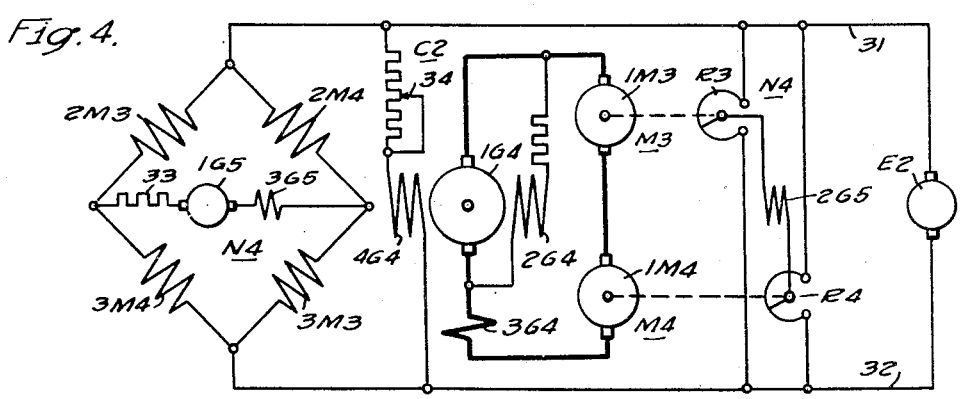
Fig. 4 is an explanatory straight-line diagram of the appertaining circuits.

The armatures 1M3 and 1M4 of motors M3 and M4, respectively, are connected in series with each other across the armature 1G4 of a main generator G4. This generator has a shunt field winding 2G4, a series field winding 3G4, and a separately excited field winding 4G4. The field winding 4G4 is connected through a rheostat 34, under control by a master controller C2, across the leads 31 and 32 of the direct-current circuit which, in Fig. 4, is shown to be excited by a constant voltage exciter E2 to be driven by the drive motor 35 (Fig. 3) of the main generator G4.

During the operation of the system, the two motors receive constant field excitation in the bridge network N3 from the exciter E2, and the motor speed is controlled by controlling the excitation of the main generator field winding 4G4 with the aid of the master controller C2. Under these conditions, the currents flowing through the motor armatures are equal and their respective fields are also equal so that the torques of the two motors are also substantially equal. Should one motor run faster when lifting the bridge structure, the arms of the rheostats R3 and R4 are not in the same relative position, and the control field winding 2G5 is excited in the direction to weaken the field of the fast motor and to strengthen the field of the slow motor. The torque of the fast motor is reduced, causing it to slow down; while the torque of the other is increased, causing it to speed up. The resultant effect is to keep both motors in synchronous operation so that the bridge structure, while being raised, is kept in level position.

In the lowering direction, the motors have overhauling loads, and hence will regenerate. Should one motor attempt to run faster than the other, the control generator G5 will strengthen the field of the first motor and weaken the field of the slow motor, thus causing the first motor to slow down, and the slow motor to speed up. Again, the result is to keep both motors operating in synchronism so that the bridge remains level during the lowering performance.

The armature current of the motors being limited, the maximum torque developed by these motors is likewise limited. If one motor can not develop sufficient torque to lift its end of the bridge, the control generator G5 has sufficient capacity to neutralize the field of the other motor so that it can not lift the other end of the bridge. Hence, the system involves also an automatic safety performance.

The control generator G5 shown in Figs. 3 and 4 also is preferably of the amplifying type, and for that reason is shown to have a tuned self-excited field winding, as described previously in conjunction with the control generator G3 of Figs. 1 and 2.

While in the illustrated embodiments, I have shown potentiometric rheostats R1, R2, R3 and R4, for controlling the field excitation of the control generators, it is obvious that other suitable voltage-control devices may likewise be employed. It will furthermore be understood that, instead of providing a mechanical transmission between these voltage-control devices and the appertaining drives, any other suitable transmission may be used instead. For instance, the voltage-control devices may be located at some point remote from the driving motors and may be connected with these motors or the structure to be moved thereby, by means of a synchrotie connection or the like electric transmitting devices.

Figure 5:
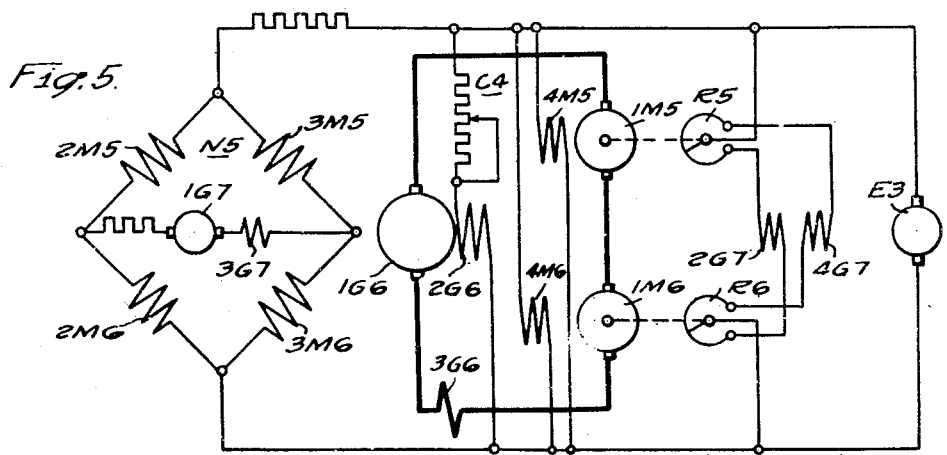
Fig. 5 represents a straight-line circuit diagram of a third modification.

Some other modifications within the principles of my invention will be understood from the embodiment shown, in Fig. 5, merely as a straight-line diagram because it resembles as to other features the embodiments described above with reference to Figs. 1 and 3.

In Fig. 5, the armatures of the two jointly-controlled drive motors are denoted by 1M5 and 1M6. These armatures are series-connected across the armature 1G6 of a main generator. In this respect, the motor circuit resembles that of Fig. 4. The main generator has a series field winding 3G6 and a separately-excited field winding 2G6 which receives excitation from a constant voltage exciter E3 under control by a master controller C4. The two drive motors have each three field windings denoted by 2M5, 3M5, 4M5 and 2M6, 3M6, 4M6, respectively. The field windings 4M5 and 4M6 receive constant excitation from the exciter E3. The field windings 2M5, 3M5 and 3M6, 2M6 are connected in a bridge network N5 so that they form four circuit branches thereof. The armature 1G7 and a self-excited field winding 3G7 of an amplifying control generator are connected across two opposite points of the bridge network, while the remaining two diagonal points are either left free or, as shown, are connected across the constant voltage leads so as to operate with a desired degree of magnetization. The windings 2M5 and 3M5 appertaining to the motor armature 1M5 act differentially with respect to each other. The windings 2M6 and 3M6 appertaining to the motor armature 1M6 are likewise differential with repect to each other. When the control generator supplies no control voltage, the two field windings 2M5 and 3M5 are balanced against each other, and the field windings 2M6 and 3M6 are also balanced. The speed of the two motors is then determined by the constant field excitation of windings 4M5 and 4M6, respectively, and by the adjustable armature current generated in the generator armature 1G6 under control by the master controller C4. When the control generator generates a corrective voltage, this voltage has the effect of unbalancing the two differential field windings of each motor so that the resultant unbalance has one direction in one motor, and the opposite direction in the other. Consequently, one motor is then caused to speed up while the other will decelerate, thus achieving a synchronizing performance similar to those of the preceding embodiments.

The field control of the control generator in the embodiment of Fig. 5 is effected by two separately-excited control field windings 2G7 and 4G7 which are magnetically associated with the armature 1G7. The two control field windings are connected to a network that receives constant energization from the exciter E3 and includes two potentiometric rheostats R5 and R6 whose contact arms are associated with the motor armatures 1M5 and 1M6, respectively, so that the rate of potentiometric adjustment in each rheostat corresponds to the speed of the appertaining motor. When the two motors or the points of the structure moved by these motors maintain a given positional relation to each other, both control field windings 2G7 and 4G7 receive equal amounts of excitation, and hence balance each other so that the control voltage across the armature 1G7 remains zero. When one motor runs faster than the other, the relative adjustment of the rheostat arms departs from the proper value so that one of the control field windings 2G7 and 4G7 receives more excitation than the other. The resultant field in the control generator has a magnitude and polarity corresponding to the magnitude and direction of the departure from the proper positional relation between the rheostat arms. As a result, the control generator generates a corrective voltage which produces the above-mentioned unbalancing effect in the network N5, and thus causes the two motors to adjust themselves to the proper speed and positional relation.

It will be understood by those skilled in the art that the principles of my invention can be realized by embodiments and modifications other than those specifically described in the foregoing without departing from the essential features of my invention, as set forth in the claims attached hereto.

I claim as my invention:

1. In combination with movable structure, a control system for positioning said structure comprising two variable-voltage direct-current drives in mechanical driving connection with said structure at spaced points thereof and including respective dynamo-electric machines having field windings for controlling the speed of said drives respectively, a network having two pairs of terminals and including four series-arranged circuit branches and having a diagonal branch across two of said terminals, said field windings of said respective machines being disposed in different ones of said circuit branches, a control generator having an armature for generating a variable control voltage and separately excitable field means for controlling said variable voltage, said armature being connected in said diagonal branch for differentially varying said energization, circuit means connected to said field means for exciting the latter and comprising two adjustable control devices for jointly controlling the excitation of said field means, said two control devices being mutually balanceable as regards their respective control effects and being associated with said respective drives so as to be adjusted in accordance with the positions of said structure at said respective points, whereby said control generator, when said positions depart from a given mutual relation, is caused to generate a control voltage of the direction and magnitude required to maintain said relation.

2. In combination with movable structure, a control system for positioning said structure comprising two variable-voltage direct-current drives in mechanical driving connection with said structure at spaced points thereof and including respective dynamo-electric machines having field windings for controlling the speed of said drives respectively, a bridge network having two pairs of terminals and including four series-arranged circuit branches and having a balanceable diagonal branch across two of said terminals, said field windings of said respective machines being disposed in different circuit branches respectively of said network, a circuit attached to said other two terminals for providing energization for said field windings, a control generator having an armature connected in said diagonal branch so as to differentially vary said energization when generating a control voltage and having a control-field winding for controlling said control voltage, two potentiometric rheostats each having a resistor and an adjusting member and being interconnected to form another bridge network having current-supply terminals and a zero branch, said control-field winding being connected in said zero branch, and said adjusting members being mechanically connected to said respective drives in order to have their respective adjustments dependent upon the positions of said structure at said respective points so that said control-field winding receives substantially zero excitation from said rheostats when said positions maintain a desired mutual relation.

3. In combination with movable structure, a control system for positioning said structure comprising two variable-voltage direct-current drives in mechanical driving connection with said structure at spaced points thereof and including respective dynamo-electric machines having field windings for controlling the speed of said drives respectively, a bridge network having two pairs of terminals and including four series-arranged circuit branches and having a balanceable diagonal branch across two of said terminals, said field windings of said respective machines being disposed in adjacent circuit branches respectively of said network, a circuit attached to said other two terminals for providing energization for said field windings, a control generator having an armature for generating a reversible control voltage and including a separately-excited field winding for controlling said control voltage and a tuned self-excited field winding for amplifying said control voltage, said armature and said self-excited field winding being connected in said diagonal branch, two potentiometric rheostats connected to said circuit and having respective adjustable contacts connected with each other so as to form another bridge network having a zero branch, said separately-excited field winding being disposed in said zero branch to be energized only when the adjustments of said respective contacts depart from a given correlation, said contacts being mechanically connected to said respective drives so that their adjustment is indicative of the positions of said structure at said respective points.

4. A system for controlling two drives in correlated performance, comprising two variable-voltage direct-current drives including respective dynamo-electric machines having field windings for controlling the speed of said drives respectively, a bridge network having two pairs of terminals and including four series-arranged circuit branches and having a balanceable diagonal branch across two of said terminals, said field windings of said respective machines being disposed in adjacent circuit branches respectively of said network, a circuit attached to said other two terminals for providing energization for said field windings, said circuit having operator-controllable means for selectively adjusting said energization in accordance with the desired speed of said drives, a control generator having an armature for generating a variable control voltage and separately excitable field means for controlling said variable voltage, said armature being connected in said diagonal branch for differentially varying said energization, circuit means connected to said field means and comprising two adjustable control devices disposed for mutually differential control of the excitation of said field means, said control devices being associated with said respective drives so that their rate of adjustment is dependent upon the speed of said respective drives.

5. A system for controlling two correlated drives, comprising two direct-current drive motors, two generators in energizing connection with said respective motors and having respective field windings for controlling the motor speed by controlling the voltage of said respective generators, a bridge network having two pairs of terminals and including four series-arranged circuit branches and having a balanceable diagonal branch across two of said terminals, said field windings of said respective generators being disposed in adjacent circuit branches respectively of said network, a circuit attached to said other two terminals for providing energization for said field windings, a control generator having an armature for generating a variable control voltage and separately excitable field means for controlling said variable voltage, said armature being connected in said diagonal branch for differentially varying said energization, circuit means connected to said field means and comprising two adjustable control devices disposed for mutually differential control of the excitation of said field means, said control devices being associated with said respective drives so that their rate of adjustment is dependent upon the speed of said respective drives.

6. A system for controlling two correlated drives, comprising two direct-current drive motors, two generators in energizing connection with said respective motors and having respective field windings for controlling the motor speed by controlling the voltage of said respective generators, a bridge network having two pairs of terminals and including four series-arranged circuit branches and having a balanceable diagonal branch across two of said terminals, said field windings of said respective generators, being disposed in adjacent circuit branches respectively of said network, said circuit having operator-controllable selector means for adjusting said energization in accordance with a desired speed of said motors, two potentiometric rheostats connected to said circuit and having respective adjustable contacts connected with each other so as to form another bridge network having a zero branch, said field means being disposed in said zero branch, and said contacts being mechanically connected to said motors so that their respective rates of adjustment are dependent upon the speed of said motors respectively.

7. A system for controlling two correlated drives, comprising two direct-current drive motors having respective armatures and respective field windings, circuit means attached to said armatures for providing energizing current therefor, a bridge network having two pairs of terminals and including four series-arranged circuit branches and having a balanceable diagonal branch across two of said terminals, said field windings of said respective motors being disposed in adjacent circuit branches respectively of said network, a circuit attached to said other two terminals for providing energization for said field windings, a control generator having an armature for generating a variable control voltage and separately excitable field means for controlling said variable voltage, said armature being connected in said diagonal branch for differentially varying said energization, circuit means connected to said field means for exciting the latter and comprising two adjustable control devices for jointly controlling the excitation of said field means, said two control devices being mutually balanceable as regards their respective control effects and being mechanically connected to said motors so that their respective rates of adjustment are dependent upon the speed of said motors respectively.

8. A system for controlling two correlated drives, comprising two direct-current drive motors having respective armatures and respective field windings, a main generator having an armature connected to said motor armatures to provide current therefor and having a field winding for controlling the voltage of said current, a direct-current circuit attached to said generator field winding to supply excitation for the latter and having selectively adjustable control means for varying said excitation to thereby adjust the speed of said motors in accordance with a desired value, a bridge network having two pairs of terminals and including four series-arranged circuit branches and having a balanceable diagonal branch across two of said terminals, said field windings of said respective motors being disposed in adjacent circuit branches of said network, circuit means attached to said other two terminals for providing energization for said motor field windings, a control generator having an armature for generating a variable control voltage and separately excitable field means for controlling said variable voltage, said armature being connected in said diagonal branch for differentially varying said energization, circuit means connected to said field means for exciting the latter and comprising two adjustable control devices for jointly controlling the excitation of said field means, said two control devices being mutually balanceable as regards their respective control effects and being mechanically connected to said motors so that their respective rates of adjustment are dependent upon the speed of said motors respectively.

9. A system for controlling two correlated drives, comprising two direct-current drive motors having respective armatures and respective field windings, a main generator having an armature series-connected to said motor armatures to provide current therefor and having a field winding for controlling the voltage of said current, a direct-current circuit attached to said generator field winding to supply excitation for the latter, master control means interposed between said circuit and said generator field winding for varying said excitation to thereby adjust the speed of said motors in accordance with a desired value, a bridge network having two pairs of terminals and including four series-arranged circuit branches and having a balanceable diagonal branch across two of said terminals, said field windings of said respective motors being disposed in adjacent circuit branches of said network, said other two terminals being connected to said circuit so that the latter provides constant component energization for said motor field windings, a control generator having an armature for generating a variable control voltage and separately excitable field means for controlling said variable voltage, said armature being connected in said diagonal branch for differentially varying said energization, two voltage dividers each having a resistor connected to said circuit to develop constant voltage drop and each having an adjustable tap contact, said control field means being connected across said contacts, and said contacts being mechanically connected to said motors to be adjusted at a rate corresponding to the speed of said motors respectively so that the excitation of said control field means and hence the resultant energization of said motor field windings is controlled in direction and magnitude substantially in accordance with the departure of said two contacts from a given relative position, whereby said motors are caused to substantially maintain a given mutual performance relation.

10. A system for controlling two drives in correlated performance, comprising two variable-voltage direct-current drives including two respective dynamo-electric machines each having two cumulative field windings for controlling the speed of the drive, a bridge network having two pairs of diagonal points and including four series-arranged circuit branches formed by said four field windings so that one field winding of either machine lies serially between the two field windings of the other machine, two current supply leads attached to one pair of said diagonal points to supply current to said network for energizing said four field windings, a control generator having an armature connected in said network across said other pair of diagonal points to impress a reversible control voltage on said field windings to act in opposite senses on said two machines respectively, a control field winding in said control generator for controlling said reversible voltage, two voltage dividing rheostats having mutually parallel-connected resistors and two interconnected respective tap contacts so as to form another bridge network having a zero diagonal, said control field winding being disposed in said zero diagonal so as to be excited when the position of said respective contacts departs from a given mutual relation, and mechanical means connecting said contacts with said respective drives so that the rate of positional change of each contact is indicative of the speed of the appertaining drive.

11. A system for controlling two correlated drives, comprising two direct-current drive motors, two generators in energizing connection with said respective motors, each of said generators having two cumulative field windings for controlling the generated voltage and hence the speed of the appertaining motor, a bridge network having two pairs of diagonal points and including four series-arranged circuit branches formed by said four field windings so that one field winding of either generator lies serially between the two field windings of the other generator, a direct-current circuit having selective voltage control means and being attached to one pair of said diagonal points to supply current to said network for energizing said four field windings, a control generator having an armature connected in said network across said other pair of diagonal points to impress a reversible control voltage on said field windings to act in opposite senses on said two generators respectively, said control generator having control field means for controlling said variable voltage as to direction and magnitude, two adjustable voltage control devices electrically connected to said control field means so as to be mutually balanceable with respect to the resultant excitation of said field means, and mechanically connected to said respective motors so that the rate of voltage change of each device is substantially in accordance with the speed of the appertaining motor.

12. A system for controlling two drives for correlated performance, comprising two direct-current motors each having an armature and two cumulative field windings, circuit means attached to said armatures for providing energizing current therefor, a bridge network having two pairs of diagonal points and including four series-arranged circuit branches formed by said four field windings so that one field winding of either motor lies serially between the two field windings of the other, two current supply leads attached to one pair of said diagonal points to supply current to said network for energizing said four field windings, a control generator having an armature connected in said network across said other pair of diagonal points to impress a reversible control voltage on said field windings to act in opposite senses on said two motors respectively, said control generator having control field means for controlling said variable voltage as to direction and magnitude, two adjustable voltage control devices electrically connected to said control field means so as to be mutually balanceable with respect to the resultant excitation of said field means, and mechanically connected to said respective motors so that the rate of voltage change of each device is substantially in accordance with the speed of the appertaining motor.

13. A system for controlling two drives for correlated performance, comprising two direct-current motors each having an armature and two cumulative field windings, a main generator having an armature series-connected to said motor armature to provide current therefor and having a field winding for controlling the voltage of said current, a direct-current circuit attached to said generator field winding to supply excitation for the latter and having selectively adjustable control means for varying said excitation to thereby adjust the speed of said motors in accordance with a desired value, a bridge network having two pairs of diagonal points and including four series-arranged circuit branches formed by said four field windings so that one field winding of either motor lies serially between the two field windings of the other motor, two current supply leads attached to one pair of said diagonal points to supply current to said network for energizing said four field windings, a control generator having an armature connected in said network across said other pair of diagonal points to impress a reversible control voltage on said field windings to act in opposite senses on said two motors respectively, said control generator having control field means for controlling said variable voltage as to direction and magnitude, two adjustable voltage control devices electrically connected to said control field means so as to be mutually balanceable with respect to the resultant excitation of said field means, and mechanically connected to said respective motors so that the rate of voltage change of each device is substantially in accordance with the speed of the appertaining motor.

14. A system for controlling two drives in correlated performance, comprising two variable-voltage direct-current drives including respective dynamo-electric machines having field windings for controlling the speed of said drives respectively, a network having mutually balanced circuit branches and a diagonal branch, said field windings of said machines being disposed in said respective circuit branches, a control generator having an armature for generating a variable control voltage and separately excitable field means for controlling said variable voltage, said armature being connected in said diagonal branch for differentially varying said energization, circuit means connected to said field means and comprising two adjustable control devices disposed for mutually differential control of the excitation of said field means, said control devices being associated with said respective drives so that their rate of adjustment is dependent upon the speed of said respective drives.

GEORGE E. KING.